(12) United States Patent
Minus

(10) Patent No.: US 8,101,218 B2
(45) Date of Patent: Jan. 24, 2012

(54) NUTRITIONAL BEVERAGE FORMULATION

(76) Inventor: Leslie J. Minus, Freeport (BS)

( * ) Notice: Subject to any disclaimer, the term of this patent is extended or adjusted under 35 U.S.C. 154(b) by 577 days.

(21) Appl. No.: 11/730,414

(22) Filed: Apr. 2, 2007

(65) Prior Publication Data

US 2008/0241318 A1 Oct. 2, 2008

(51) Int. Cl.
*A23L 1/30* (2006.01)
*A23L 2/00* (2006.01)
*A23L 1/00* (2006.01)

(52) U.S. Cl. ........... 426/72; 426/590; 426/618; 426/648

(58) Field of Classification Search .................. 426/72, 426/132, 593, 590, 618, 648
See application file for complete search history.

(56) References Cited

U.S. PATENT DOCUMENTS

| | | | |
|---|---|---|---|
| 4,770,894 A | 9/1988 | Usui et al. | |
| 5,296,246 A | 3/1994 | Inoue et al. | |
| 5,443,830 A * | 8/1995 | Moore et al. | 424/736 |
| 5,639,731 A | 6/1997 | Newsholme et al. | |
| 6,020,016 A * | 2/2000 | Castleberry | 426/590 |
| 6,514,544 B2 | 2/2003 | Fuchs et al. | |
| 6,803,062 B2 | 10/2004 | Yamamoto et al. | |
| 6,989,164 B2 | 1/2006 | Trant | |
| 2001/0002269 A1* | 5/2001 | Zhao | 426/112 |
| 2002/0012689 A1 | 1/2002 | Stillman | |
| 2003/0064104 A1 | 4/2003 | Stillman | |
| 2004/0096547 A1 | 5/2004 | Ferruzzi | |
| 2005/0064070 A1 | 3/2005 | Liebrecht | |
| 2006/0088575 A1 | 4/2006 | Brewitt | |

OTHER PUBLICATIONS

Pryor, H., 'Oatmeal Porridge', Copyright 1999, Accessed Mar. 12, 2009.*
Sanders, J, 'Cocoa Oatmeal with Dates', Nov. 15, 2003, Accessed Mar. 12, 2009.*
Food Facts & Trivia, 'Cream of Tartar', Feb. 2, 2003, Accessed Mar. 12, 2009.*
'Oats; in cookies, oatmeal, breads, and more', Sunset, Feb. 1987, Accessed Mar. 12, 2009.*
'Inland Seawater', 2006, accessed Mar. 12, 2009.*
'Animal Parade Liquid', 2006, accessed Mar. 12, 2009.*
'Maple-Flaxseed Oatmeal', Foodfit.com, 2005, accessed Mar. 12, 2009.*
'Apple-Harvest-Oatmeal', Mar. 14, 1998, Accessed Mar. 12, 2009.*
'Oats Recipes', Lifestyle Magazine, Jun. 26, 2008.*
Herbal Remedies. Liquid Multi Vita-Mineral, Orange Mango, Trace Minerals. [Online] Retrieved Jan. 25, 2006 using Internet Archive Wayback Machines from the Internet <http://replay.waybackmachine.org/20060125173047/http://www.herbalremedies.com/liquid-multi-vitamin.htm>.*
Pine Island Nursery. Products p. G-L. [Online] Retrieved Dec. 6, 2005 using Internet Archive Wayback Machine from the Internet <http://replay.waybackmachine.org/20051206084211/http:/www.tropicalfruitnursery.com/fruitproducts_sw.htm>.*

* cited by examiner

*Primary Examiner* — Humera Sheikh
*Assistant Examiner* — Setsuko Kamotani
(74) *Attorney, Agent, or Firm* — Leander F. Aulisio

(57) ABSTRACT

A nutritional beverage formulation for achievement of optimum health in an individual.

2 Claims, No Drawings

NUTRITIONAL BEVERAGE FORMULATION

BACKGROUND OF THE INVENTION

There are many nutritional formulations on the market. They are in the form of liquids, gels, shakes, bars, solid foods and the like. The ingredients in such formulations are many and varied. They include vitamins, amino acids, enzymes, proteins, carbohydrates, fats, minerals and the like.

U.S. Pat. No. 5,639,731, issued to Newsholme et al, discloses a method for improving mental performance during strenuous physical activity. The method comprises the step of administering a ready-to-drink beverage comprising branched chain amino acids, oligosaccharides and monosaccharides.

U.S. Pat. No. 5,296,246, issued to Inoue et al, discloses a beverage composition containing an active amino acid calcium product. The product can contain hydrolysable amino acid derivatives.

Published Application 2005/0064070, to Liebrecht, relates to a liquid beverage product containing: vitamins A, E, B1, B2, B6, C; niacin, pantothenic acid, calcium, chloride, copper, chromium, magnesium, phosphorus, potassium, sodium, zinc, isoleucine, leucine, valine and water.

Published Application 2004/0096547, to Ferruzi, relates to a ready-to-drink energy beverage containing: a carbohydrate, a protein, a stimulant and a vitamin premix.

U.S. Pat. No. 6,989,164, issued to Trant, discloses a pharmaceutical composition having fertility promoting activity in males. The composition contains: green tea, vitamin C, vitamin E, selenium, L-carnitine, ferulic acid in Dong quai, vitamin B6, vitamin B12, folate, and zinc.

U.S. Pat. No. 6,514,544, issued to Fuchs et al, discloses a drink composition containing: fructose, at least one component of the Vitamin B complex, and taurine.

There is a need for a nutritional beverage that can supply the ingredients necessary for optimal health of the human organism. The beverage is preferably easy to consume and delicious to the taste. In addition, there is a need for a basic exercise regimen that allows an individual to maintain flexibility. There is also a need for a suitable dietary regimen that permits the individual to maintain overall nutritional health. In a preferred embodiment, a kit comprising a nutritional beverage, an instructional chart outlining a basic exercise regiment and an instructional manual disclosing a dietary regimen is disclosed.

SUMMARY OF THE INVENTION

The present invention relates to a liquid nutritional formulation that is substantially a "complete" food. In order for a formulation to be a "complete" food, various ingredients must be present. Those ingredients are vitamins, minerals, amino acids and enzymes. The human body can repair itself if it can obtain sufficient amounts of these four ingredients. The present inventive formulation is completely plant based. It appears that a plant-based formulation generates less stress on the digestive system of the individual. The daily consumption of a "complete" food allows re-establishment of the balance necessary for good health.

The present invention also relates to a kit containing the nutritional beverage formulation, an exercise manual and a diet manual. In an alternative embodiment, the nutritional beverage formulation can be in powder form. The powder form is then mixed into water to obtain a drinkable beverage. The exercise manual contains instructions on how to perform exercises for improving prostate health and the like. The diet manual contains instructions for creating a well-balanced lifestyle with regard to eating habits.

DETAILED DESCRIPTION OF THE INVENTION

The nutritional beverage formulation of the present invention is formulated based on the concept that the human body, given the correct amount of necessary ingredients, can repair itself. All of the glands and organs of the human body are interrelated. The glandular system of the human organism functions in a synergistic manner with the endocrine system of the human body. If one gland or organ is diseased, this will eventually affect the other glands and organs. A weight management problem could be fundamentally a thyroid glandular problem. Another example of synergism in the human body is that taking birth control pills to affect one glandular system also affects the adrenal gland. A further example of synergism is the effect of the cowper's gland on the prostate gland Every human body has a preferred muscle ratio and a preferred fat ratio. When these ratios are maintained, there is minimal stress on the kidneys. Otherwise, the kidneys become weaker due to constant stress.

Another factor that increases stress on the kidneys is the consumption of meat products. Animal protein is quite difficult to digest. It remains in the system for an extended period of time.

The nutritional beverage formulation of the present invention places very little metabolic stress on the digestive system. It is entirely plant based, and contains little or no ingredients that must be broken down by the body, such as proteins, carbohydrates, fats and the like.

The quality of the cells is the essence of good health in the human organism. When cells lack the necessary nutrients, they begin to communicate with each other that the organism is beginning to die. With increased communication between the cells, pathogenic agents become dominant and begin to invade the organism. We describe such conditions as cancer, diabetes, stroke, hypertension and the like. The quality of the cells rapidly decreases, thus affecting the quality of the tissues and organs of the human body.

Tropical fruits contain a storehouse of light energy. The fruit is a culmination of four years of growth for the plant. This light energy stored in the tropical fruits can be processed by the human body to give cellular energy.

The present beverage is free of any processed sugar. It is totally plant based. The beverage also contains anti-oxidants for preventing stress on the kidneys; and digestive enzymes for allowing the kidneys to function as proficient filters.

A lifestyle that many people are adopting today is that of vegetarianism. There are various forms of vegetarianism. However, they all have one thing in common, and that is that large amounts of roughage are consumed by the practitioners. When the human body is subjected to too much roughage, bleeding in the ileum and the colon can occur. Fresh vegetables in particular are the culprits because the human system must attempt to break down all the cellulose. This adds a severe stress to the human system, with the possible occurrence of internal bleeding. Vegetarians would actually be much healthier if they could cut down on the amount of raw vegetables that they consume. They can then supplement their diet with the beverage of the present invention.

Bodybuilders are interested in achieving a high level of physical fitness. However, many of them take protein drinks, the protein being mainly whey protein and the like. These protein drinks have a tendency to damage the kidney. It would be be beneficial for these bodybuilders to throw out the protein drinks and use the nutritional beverage formulation of the present invention. The present beverage formulation contains amino acids and no protein. Thus there is less stress on the kidneys, since the kidneys do not have to break down the protein.

Many people today suffer from high blood pressure. They do not realize that they are actually developing kidney trouble. The adrenal gland, which sits just on top of the kidney, can become overactive. The extra rush of adrenalin causes rapid heart beat. The adrenal gland, along with the thymus gland, therefore controls the stress on the heart. The kidney comes into play because it is the organ responsible for filtration. However, a person who is overweight has kidneys that are overworked. They have too much liquid to filter, as the fat cells store large amounts of water.

The ideal condition for the human subject with regard to nutrition is to consume a minimal amount of nutritional foods. The minimal amount of foods is the amount that provides energy for the needs of the organism, while maintaining the optimal weight of the organism. Optimal weight relates to the set point of each organism, the set point being the weight necessary to give the organism the most beneficial functioning of the organs, glands, tissues and the like. The most beneficial functioning of the various parts of the human organism is the functioning that provides for the optimum duration of the kidney function and the heart function.

The kidney function and the heart function of an organism have an optimum duration that is established by the chromosomes of the organism. There is a timing mechanism in the genes that determines the lifespan of the individual organism. This can be viewed as a genetic metamorphosis that is an inherited trait. The nutritional regimen of the individual organism can greatly affect this genetic metamorphosis.

The human organism has a metabolic process that is the opposite of the metabolic process of plants. Tropical fruits are the result of about four years of growth of the plant. Optimal absorption of light allows tropical fruits to store vast amounts of energy. This light energy translates into cellular energy. Tropical plants, and hence tropical fruit, hold vast amounts of cellular energy. Such energy can be tapped by consumption of the beverage of the present invention. This beverage is substantially totally plant based. It is also substantially free of processed sugar. Anti-oxidants are present in the beverage to aid in removal of stress on the kidneys. Enzymes that aid in digestion are also included in the beverage of the present invention.

The present invention also relates to a kit containing the nutritional beverage formulation, an exercise manual and a diet manual. In an alternative embodiment, the nutritional beverage formulation can be in powder form. The powder form is then mixed into water to obtain a drinkable beverage. The exercise manual contains instructions on how to perform exercises for improving prostate health and the like. The diet manual contains instructions for creating a well-balanced lifestyle with regard to eating habits.

A nutritional beverage formulation is disclosed. The formulation comprises: whole oats; ground cocoa; cream of tartar; cinnamon; nutmeg; banana; honey; aloe vera; sea water; and liquid multivitamin with iron. The balance of the formulation is water that has been heated at a temperature from about 145 to about 212 degrees F.

The nutritional beverage formulation further comprises: nuts selected from the group consisting of peanuts, walnuts and cashews; a fruit selected from the group consisting of apple and sapodilla, wherein the fruit is peeled; unsweetened soy milk; flaxseed meal; and seedless raisins.

In a preferred embodiment of the present invention, the nutritional beverage formulation comprises: whole oats in an amount of about 4 oz. to about 8 oz.; ground cocoa in an amount of about ½ tablespoon to about 1½ tablespoons; cream of tartar in an amount of about ⅛ teaspoon to about ½ teaspoon; cinnamon in an amount of about ¼ teaspoon to about ¾ teaspoon; nutmeg in an amount of about ⅛ teaspoon to about ½ teaspoon; banana in an amount of about ¾ of a whole banana to about 1½ whole bananas; honey in an amount of about 1 ounce to about 2 ounces; aloe vera in an amount of about 2 ounces to 4 ounces; sea water in an amount of about ½ tablespoon to about 2 tablespoons; and liquid multivitamin with iron in an amount of about ½ tablespoon to about 1½ tablespoons. The balance of the formulation is water in an amount of about 15 ounces to about 20 ounces. The water has been heated at a temperature of from about 145 to about 212 degrees F.

The nutritional beverage formulation in the preferred embodiment further comprises: nuts selected from the group consisting of peanuts, walnuts and cashews in an amount of about 1 ounce to 3 ounces; a fruit selected from the group consisting of apple and sapodilla, wherein the fruit is peeled; the fruit present in an amount of about one piece of fruit to about 2 pieces of fruit; unsweetened soy milk in an amount of about 15 ounces to 20 ounces; flaxseed meal in an amount of about ½ tablespoons to about 1½ tablespoons; and seedless raisins in an amount of about 1 ounce to 3 ounces.

A process for preparing a nutritional beverage formulation is also disclosed. The process comprises the steps of: obtaining water in an amount of about 15 ounces to about 20 ounces; heating the water at a temperature of about 145 degrees F. to about 212 degrees F. for a time of about 3 minutes to 5 minutes; adding to the heated water whole oats in an amount of about 4 oz. to about 8 oz.; adding to the heated water ground cocoa in an amount of about ½ tablespoon to about 1½ tablespoons; adding to the heated water cream of tartar in an amount of about ⅛ teaspoon to about ½ teaspoon; adding to the heated water cinnamon in an amount of about ¼ teaspoon to about ¾ teaspoon; adding to the heated water nutmeg in an amount of about ⅛ teaspoon to about ½ teaspoon; adding to the heated water banana in an amount of about ¾ of a whole banana to about 1½ whole bananas; adding to the heated water honey in an amount of about 1 ounce to about 2 ounces; adding to the heated water aloe vera in an amount of about 2 ounces to 4 ounces; boiling sea water in an amount of about ½ tablespoon to about 2 tablespoons for a time of about three minutes to about five minutes; adding boiled sea water to the heated water; adding to the heated water liquid multivitamin with iron in an amount of about ½ tablespoon to about 1½ tablespoons; and blending the heated water and the additives for a time of about 2 minutes to about 5 minutes to obtain the nutritional beverage formulation.

The process for preparing a nutritional beverage formulation further comprises the steps of: adding to the heated water nuts selected from the group consisting of peanuts, walnuts and cashews in an amount of about 1 ounce to 3 ounces; adding to the heated water a fruit selected from the group consisting of apple and sapodilla, wherein the fruit is peeled; the fruit present in an amount of about one piece of fruit to about 2 pieces of fruit; adding to the heated water unsweetened soy milk in an amount of about 15 ounces to 20 ounces; adding to the heated water flaxseed meal in an amount of about ½ tablespoons to about 1½ tablespoons; adding to the heated water seedless raisins in an amount of about 1 ounce to 3 ounces; and blending the heated water and additives for a time of about 2 minutes to about 5 minutes to obtain the nutritional beverage formulation.

The nutritional beverage formulation of the present invention preferably has a consistency of a milkshake.

The exercises in the exercise manual are performed after a good night's sleep. Humans are diurnial animals, tending to sleep during darkness. The ideal time to exercise is therefore shortly after waking up in the morning. The human body, if it is flexible, is ready to exercise in the morning. The present exercise regimen is intended to mimic the motions that are performed throughout the physical development of a human infant.

The exercise regimen begins with an individual lying on his back on a sleeping surface. The sleeping surface is flat and firm. A high quality mattress is a preferred sleeping surface. The knees are brought to the face and grasped with both hands, and held for about 15 seconds. This exercise can be performed a number of times.

The second exercise is extension of the legs outward, but keeping the heels raised above the sleeping surface about four inches. The legs are then moved in a scissors-like motion. The motion can be both in horizontal direction and in vertical direction. Fifteen repetitions are performed. Advanced students can perform sets of scissors-like motions.

In the third exercise, the toes are then touched with both hands. The knees are not bent. A beginner performs fifteen repetitions. Advanced students can perform sets of toe-touches.

For the fourth exercise, arms are raised above the head, and shoulders are rotated from side to side. This exercise is performed with the head and buttocks in contact with the surface of the bed. Preferably, ten repetitions are performed. Advanced students can perform sets of repetitions.

The fifth exercise includes raising the head about three inches above the surface. Preferably, ten repetitions are performed. Chin tilts toward the thorax.

In the sixth exercise, the body position is changed lying on the stomach. The sleeping surface must be firm so that there is minimal curvature in the torso. Arms are extended along the sides of the body. The head remains in a comfortable position. Legs are raised toward the buttocks. Ankles are then firmly grasped by the hands. This position is held for about fifteen seconds.

The seventh exercise includes raising both legs to form a ninety degree angle with the thighs, and then lowered. Preferably, fifteen repetitions are performed.

The eighth exercise includes bringing the body to a kneeling position, with the hands, knees and toes touching the surface. The head is then rotated from side to side and also up and down. This movement is deliberate and not violent. Facial muscles are then stretched.

The ninth exercise includes remaining in a kneeling position and bringing the head to the surface next to the knees. This position is held for fifteen seconds.

In the tenth exercise, one leg is extended and raised to a comfortable height. The leg is substantially straight. The extended leg is then returned to its original position, and the other leg is extended and raised. Preferably, fifteen repetitions of this exercise are performed.

The eleventh exercise includes lying down again, flat on the back. Both legs are raised until the knees substantially touch the face. The legs are kept slightly bent. This position is held for about fifteen seconds.

The twelfth exercise includes assuming a seated position. Both legs are then extended outward as far as possible. Preferably, fifteen repetitions are performed.

The thirteenth exercise includes assuming a standing position on the floor. The toes are touched with both hands, keeping the knees straight. This position is held for fifteen seconds.

The fourteenth exercise includes placing both hands behind the knees while in a standing position. The forehead is brought as close to the knees as possible, without straining. This position is then held for about fifteen seconds.

The fifteenth exercise includes stooping until the thighs are parallel with the floor. The upper body remains vertical. Preferably, fifteen repetitions are performed, alternating between standing and stooping.

The sixteenth exercise includes remaining in a standing position and opening the legs to about shoulder width. Legs are kept straight. The left foot is touched with the right hand, and the right foot is touched with the left hand. Preferably, fifteen repetitions are performed on each side of the body.

The seventeenth exercise includes remaining in the standing position with legs straight and about shoulder width. Both hands are reached to the rear of the legs, with hands attempting to touch the floor. Preferably, fifteen repetitions are performed.

The eighteenth exercise includes remaining in the standing position and reaching over the head with the right hand, touching the left shoulder. The right hand is then returned to the side of the body, and the left hand then touches the right shoulder. Preferably, fifteen repetitions are performed with each hand.

In the nineteenth exercise, remaining in the same standing position, the right foot is raised to the buttocks and grasped with the right hand. This position is held for about fifteen seconds. The same movement is then performed with the left hand and left ankle.

In the twentieth exercise, remaining in the standing position, with feet about five inches apart, both arms are extended outward, and then rotated in a circular motion, starting with small circles and increasing the size of the circle. Fifteen repetitions are performed in the forward direction, and then fifteen repetitions are performed in the backward direction.

In the twenty-first exercise, remaining in the same standing position, both arms are extended outward, and then bent at the elbows to touch the hands to the shoulders. The upper torso is then rotated from side to side. Preferably, fifteen repetitions are performed. Advanced students can do sets of fifteen repetitions.

All of the exercise movements are performed in a consecutive fashion, with minimum rest in between the exercise movements.

A weekly exercise program is performed in addition to the above described fifteen exercises. The weekly program includes riding the bicycle for at least twenty minutes. The riding is performed four times per week.

The weekly exercise program also includes brisk walking for at least twenty minutes. The brisk walking is performed three times per week.

The diet instructions in the diet manual are as follows. In the morning, the human consumes one glass (about 8-10 ounces) of water, the water including a few drops of lime juice. The water should not be too soft or obtained from a reverse osmosis process. The human then consumes pancakes (blueberry or banana) with honey glaze. After the pancakes, the human drinks ten ounces of the nutritional beverage formulation of the present invention. If still hungry, the human then consumes two eggs (but only one yolk). The eggs are boiled or fried. If the eggs are fried, they are cooked in polyunsaturated oil. If the human desires even more food for breakfast, he then consumes sautéed calaloo, ackee or spinach. Tomatoes and sweet pepper (all colors) can be included in the sautéed meal. Two slices of toasted whole wheat bread are consumed with the sautéed meal. If the human desires more to drink, he then consumes one cup of lemongrass tea, the tea sweetened with honey or dextrose.

Throughout the day, the human consumes one glass of water every three hours.

For lunch in the noontime, the human can drink one glass of freshly blended pulp of orange, pineapple, mango and papaya. The drink is not strained. The human then eats a sandwich, the sandwich being made from fish, chicken or turkey, along with whole wheat, rye or barley bread; and Romaine lettuce, tomatoes and pickles. If still hungry, the human can eat a bowl of conch or clam chowder. Preferably, the conch or clam chowder contains potatoes. If the human desires even more food for lunch, drink one glass of freshly blended pulp of orange, pineapple, mango and papaya. The drink is not strained. The human then eats a sandwich, the sandwich being made from fish, chicken or turkey, along with whole wheat, rye or barley bread; and Romaine lettuce, tomatoes and pickles. If still hungry, the human can eat a bowl of conch or clam chowder. Preferably, the conch or clam chowder contains potatoes. If the human desires even more food for lunch, he can consume stewed or broiled fish. In a preferred embodiment, the fish is a saltwater variety, because saltwater fish have higher traces of iodine, iodine being necessary for glandular function, especially thyroid and parathyroid. Another ten ounces of the nutritional beverage formulation of the present invention are then consumed.

In the evening, the human consumes a dinner of roast chicken, fish or lamb. Cooking oils are selected from the group consisting of olive oil, peanut oil, canola oil, coconut oil and corn oil. The amount of meat or fish is preferably no more than about ten ounces. Also included in the dinner are vegetables selected from broccoli, cauliflower, carrots and a squash-type vegetable (squash, zucchini or the like). A baked potato with sour cream is also consumed by the human. A whole wheat bread roll with a small amount of butter is also consumed. The human consumes his dinner along with a glass of wine. The wine is preferably a kosher wine.

The above described nutritional regimen can be alternated among the various choices listed above. Amounts of food are adjusted to fit the lifestyle of the human, a more athletic human requiring more calories, and hence more food.

The nutritional beverage formulation of the present invention places very little metabolic stress on the digestive system. It is entirely plant based, and contains little or no ingredients that must be broken down by the body, such as proteins, carbohydrates, fats and the like.

The quality of the cells is the essence of good health in the human organism. When cells lack the necessary nutrients, they begin to communicate with each other that the organism is beginning to die. With increased communication between the cells, pathogenic agents become dominant and begin to invade the organism. We describe such conditions as cancer, diabetes, stroke, hypertension and the like. The quality of the cells rapidly decreases, thus affecting the quality of the tissues and organs of the human body.

Tropical fruits contain a storehouse of light energy. The fruit is a culmination of four years of growth for the plant. This light energy stored in the tropical fruits can be processed by the human body to give cellular energy.

The present beverage is free of any processed sugar. It is totally plant based. The beverage also contains anti-oxidants for preventing stress on the kidneys; and digestive enzymes for allowing the kidneys to function as proficient filters.

While the invention has been described by specific examples and embodiments, there is no intent to limit the inventive concept except as set forth in the following claims.

I claim:

1. A nutritional beverage formulation comprising:
   (a) whole oats in an amount of about 4 oz, to about 8 oz;
   (b) ground cocoa in an amount of about ½ tablespoon to about 1½ tablespoons;
   (c) cream of tartar in an amount of about ⅛ teaspoon to about ½ teaspoon;
   (d) cinnamon in an amount of about ¼ teaspoon to about ¾ teaspoon;
   (e) nutmeg in an amount of about ⅛ teaspoon to about ½ teaspoon;
   (f) banana in an amount of about ¾ of a whole banana to about 1½ whole bananas;
   (g) honey in an amount of about 1 ounce to about 2 ounces;
   (h) aloe vera in an amount of about 2 ounces to 4 ounces;
   (i) sea water in an amount of about ½ tablespoon to about 2 tablespoons;
   (j) liquid multivitamin with iron in an amount of about ½ tablespoon to about 1½ tablespoons;
   (k) sapodilla fruit, wherein the fruit is peeled; the fruit present in an amount of about one piece of fruit to about 2 pieces of fruit; the balance of the formulation being water in an amount of about 15 ounces to about 20 ounces that has been heated at a temperature of from about 145 to about 212 degrees F.

2. A nutritional beverage formulation according to claim 1 further comprising:
   (l) nuts selected from the group consisting of peanuts, walnuts and cashews in an amount of about 1 ounce to 3 ounces;
   (m) apple, wherein the fruit is peeled; the fruit present in an amount of about one piece of fruit to about 2 pieces of fruit;
   (n) unsweetened soy milk in an amount of about 15 ounces to 20 ounces;
   (o) flaxseed meal in an amount of about ½ tablespoons to about 1½ tablespoons; and
   (p) seedless raisins in an amount of about 1 ounce to 3 ounces.

* * * * *